United States Patent
Woodward, Jr. et al.

(10) Patent No.: US 7,023,882 B2
(45) Date of Patent: Apr. 4, 2006

(54) INTERFACING AT LEAST ONE INFORMATION STREAM WITH AT LEAST ONE MODULATOR

(75) Inventors: William D. Woodward, Jr., Lilburn, GA (US); James A. Bisher, Jr., Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 979 days.

(21) Appl. No.: 10/032,520

(22) Filed: Oct. 19, 2001

(65) Prior Publication Data

US 2003/0079230 A1 Apr. 24, 2003

(51) Int. Cl.
*H04J 1/00* (2006.01)

(52) U.S. Cl. ..................................... 370/487; 370/517

(58) Field of Classification Search .............. 370/487, 370/517; 725/138
See application file for complete search history.

(56) References Cited

U.S. PATENT DOCUMENTS

| | | | |
|---|---|---|---|
| 5,544,161 A * | 8/1996 | Bigham et al. | 370/397 |
| 5,627,836 A * | 5/1997 | Conoscenti et al. | 370/397 |
| 5,920,572 A * | 7/1999 | Washington et al. | 370/535 |
| 6,690,683 B1 * | 2/2004 | Brunheroto et al. | 370/542 |
| 6,813,271 B1 * | 11/2004 | Cable | 370/395.1 |
| 2002/0007491 A1 * | 1/2002 | Schiller et al. | 725/87 |
| 2002/0024970 A1 * | 2/2002 | Amaral et al. | 370/468 |

\* cited by examiner

*Primary Examiner*—Chau Nguyen
*Assistant Examiner*—Anthony Sol

(57) ABSTRACT

An interface is provided for interfacing at least one information stream with at least one modulator in the headend or hub of a broadband communications system. The interface allows for separating the media access control function from the modulator. By updating timing references, variable delays are handled appropriately.

38 Claims, 5 Drawing Sheets

INTERFACING AT LEAST ONE INFORMATION STREAM WITH AT LEAST ONE MODULATOR

FIELD OF THE INVENTION

This invention relates generally to broadband communications systems, and more specifically digital headends and hubs within such systems.

BACKGROUND OF THE INVENTION

Frequently, broadband systems transmit television signals to subscribers of a conditional access system. Broadband systems, such as cable and satellite television systems, typically include a headend for receiving programming, or sessions, and/or services from various sources and redistributing the programming and/or services through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links, as well as a network of distributed nodes that then transmit the programming to subscriber locations, or to a network of distributed hubs, which transmit the signals to subscriber equipment, or any combination thereof.

In a cable television system, the subscriber equipment can include, among others a cable-ready television, a cable-ready video cassette recorder (VCR), or a digital home communications terminal (DHCT) that is connected to a television, computer, or other display device. The headend typically uses modulators to provide the streams of data in RF signals to the distribution system. For certain implementations, the Data Over Cable Service Interface Specifications (DOCSIS) apply. DOCSIS as referenced in this application is described in the DOCSIS 1.0 standards (SP-RFI-105-991105) and DOCSIS 1.1 standards (SP-RFlv1.1-106-001215), which are incorporated herein by reference. DOCSIC specifies the protocol for exchanging bidirectional signals over cable and specifies a cable modem termination system (CMTS) which provides the cable plant RF physical layer functionality required for CATV headends.

The DOCSIS forward data channel is implemented such that DOCSIS signals can use existing modulators intended for Moving Picture Experts Group (MPEG) transport. This is accomplished by carrying the DOCSIS data frames within the 184 byte payload of a 188 byte MPEG transport packet. The four byte header is defined to be compatible with the MPEG packet header. The MPEG packet header contains a 13 bit number used for identification, known as the packet identification or PID. A well known PID is defined for use in carrying all DOCSIS data. MPEG transport streams include overhead information such as MPEG tables that indicate the types and location of the programming within the transport stream. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference.

A typical CMTS uses dedicated forward data channel quadrature amplitude modulation (QAM) modulators that are connected directly to the Media Access Control (MAC) functions such that the MAC functions output directly into the QAM modulators. In order to synchronize reverse channel transmissions from subscriber devices, a time reference is transmitted to each subscriber device (including a subscriber modem) cable through the forward QAM data channel. This time reference or "SYNC message" is generated in the media access control function and is typically the value of a 32 bit counter clocked by a master 10.24 MHz clock, for example, in the CMTS. Each subscriber device receives this message and synchronizes an internal clock and counter to this reference. In order for this time reference to work, it must be transmitted with a constant or near constant delay through the network.

It is desired to provide an interface on the CMTS that would allow a generic and/or non-integrated QAM modulator to be used for the forward channel data in a DOCSIS application. It is also desirable to meet the constant transport delay constraint even if multiple information streams are combined.

DETAILED DESCRIPTION OF PREFERRED EMBODIMENTS

Figure 1:
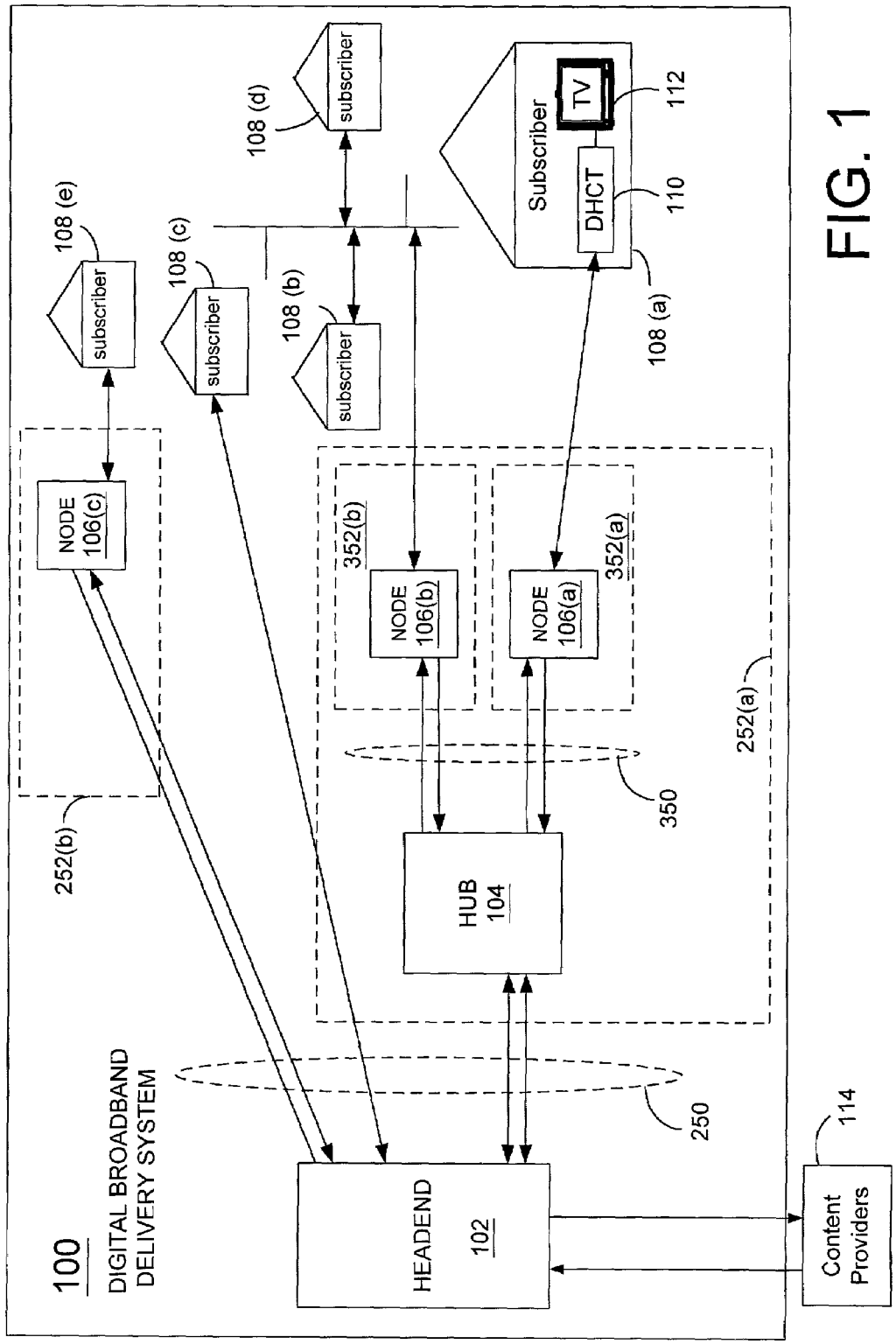
FIG. 1 is a block diagram representation of a broadband communications system, such as a cable television system, in which the preferred embodiment of the invention may be employed.

The preferred embodiments of the invention are directed to a method and a system for separating the media access control function from a quadrature amplitude modulation (QAM) modulator. In some preferred embodiments, a plurality of DOCSIS data streams and optionally MPEG video or audio streams are combined into one digital data stream that may be modulated by one or more generic QAM modulators, such as a generic QAM modulator for example, without the need for a dedicated QAM modulator to handle each stream of DOCSIS data. In one preferred embodiment, the QAM modulator may be a multi-QAM such as that described in pending U.S. patent application Ser. No. 09/845,510, which is incorporated herein by reference.

Although the transport streams of the preferred embodiments of the invention are described in terms of MPEG transport streams, it is to be understood that this is for exemplary purposes only, and that the scope of the present invention is not limited to MPEG transport streams. Furthermore, the modulators of the preferred embodiments of the invention are described in terms of radio frequency modulators, such as, but not limited to QAM modulators, and again, it is to be understood that this is a non-limiting example of a modulator. Accordingly, other conventional transport stream and modulation techniques are included in the scope of the present invention.

One preferred embodiment of the invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiments set forth herein; rather, the embodiments are provided so that this disclosure will be thorough and complete, and will fully convey the scope of the invention to those skilled in the art. All examples are intended to be non-limiting, with additional examples being included within the scope of the present invention.

Broadband System Overview

The preferred embodiment of the invention may be understood within the context of a two-way, interactive digital subscriber television system, as an example. In this discussion, the two-way interactive digital subscriber television system is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. The function of the DBDS is to provide interfaces to content providers, entitlement agents, and services, control access to and the use of the content and services, and to distribute the content and services to subscribers. The DBDS uses Motion Picture Experts Group (MPEG) transport streams for delivery of video, audio, and data entertainment services. These can include, among others, programming and services such as local television channels, premium movie channels, video-on-demand (VOD), telephone services, and Internet access.

Referring now to FIG. 1, a digital broadband distribution system (DBDS) 100 includes a headend 102, a hub 104, multiple nodes 106, a plurality of subscriber locations 108, and a plurality of digital home communication terminals (DHCTs) 110. The headend 102 provides the interface between the DBDS 100 and service and content providers 114, such as broadcasters, Internet service providers, and the like. The transmission medium between the headend 102 and the service and content providers 114 can be two-way. This allows for two-way interactive services such as Internet access via DBDS 100.

Unlike the transmission medium of prior systems, which have a main trunk and branches, the DBDS includes a plurality of distribution systems 252 that are in communication with the headend 102 via transmission medium 250. The distribution systems 252 include direct transmission from the headend 102 to subscriber locations 108 and indirect transmission from the headend 102 to the subscriber locations 108. Indirect transmission from the headend 102 includes distribution systems 252(a) and 252(b). Distribution system 252(a) includes hub 104 and a plurality of nodes 106. The hub 104 receives programming and other information from headend 102 via transmission medium 250 and transmits information via transmission medium 350 to distribution systems 352, which include nodes 106 that transmit information to subscriber locations 108 and receive information therefrom. Distribution system 252(b) includes nodes 106 that are in direct communication with headend 102 and direct communication with subscriber locations 108. In the preferred embodiment, the subscriber locations 108 are in two-way communication with the headend 102 or a hub 104 or a node 106. Typically the transmission medium 250 and the transmission medium 350 are optical fibers that allow the distribution of high quality and high speed signals.

The DBDS 100 can use broadband coaxial cable to distribute the signal within the sub-region. The headend 102 can also provide service to its immediate sub-region. For example, service and programming for the subscriber location 108(c) are sent directly to the subscriber location 108(c) from the headend 102.

The hub 104 can also function as a mini-headend for the introduction of programming and services to each sub-region, or distribution system 352, connected to the hub 104. This facilitates the introduction of different services and programming to different sub-regions within the DBDS 100. For example, the subscriber location 108(b), which is connected to node 106(b), can have different services and programming available than the services and programming available to subscriber location 108(c), which is connected directly to headend 102, even though the subscriber locations 108(b) and 108(c) may be in close physical proximity to each other. Service and programming for subscriber location 108(b) are routed through hub 104 and node 106(b), and hub 104 can introduce services and programming into the DBDS 100 that are not available through the headend 102.

At the subscriber locations 108 a decoder, or a DHCT 110, provides the two-way interface between the DBDS 100 and the subscriber. The DHCT 110 decodes the signals for display on a display device, such as a television set (TV) 112 or a computer monitor, as non-limiting examples. Those skilled in the art will appreciate that in alternative embodiments the equipment for decoding the signal can be located in a variety of equipment, including, but not limited to, a DHCT, a computer, a TV, a monitor, or an MPEG decoder.

Figure 2:
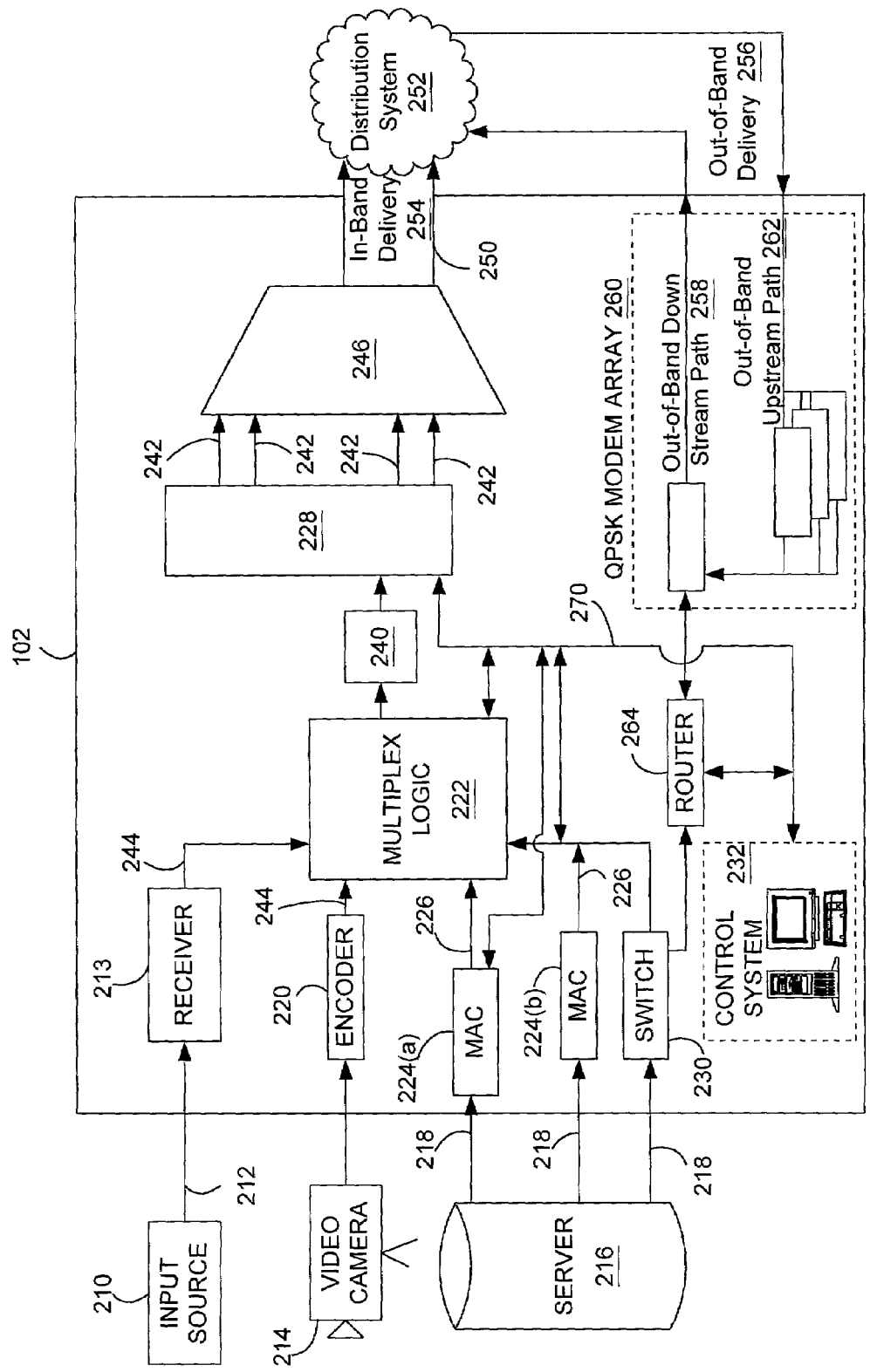
FIG. 2 is a block diagram representation of a headend in the broadband communication system in which the preferred embodiment of the invention may be employed.

FIG. 2 is an overview of a headend 102, which provides the interface between the DBDS 100 and the service and content providers 114. The overview of FIG. 2 is equally applicable to a hub 104, and the same elements and principles may be implemented at a hub 104 instead of the headend 102 as described herein. The headend 102 receives content from a variety of service and content providers 114, which can provide input in a variety of ways. The headend 102 combines the content from the various sources and distributes the content to subscribers via distribution systems 252.

In a typical system, the programming, services and other information from content providers 114 is received from a variety of input sources 210. The input signals may be transmitted from sources to the headend 102 via a variety of transmission paths, including satellites (not shown), and terrestrial broadcast transmitter and antenna, (not shown). The headend 102 can also receive content from a direct feed source 210 via a direct line 212. Other input sources from content providers 114 include a video camera 214 or an application server 216. The application server 216 may include more than one line of communication 218. The signals provided by the content or programming input sources can include a single program or a multiplex that includes several programs.

The headend 102 generally includes one or more receivers 213 that are each associated with a content source. MPEG encoders, such as encoder 220, are included for digitally encoding things such as local programming or a feed from video camera 214. The output signal from encoder 220 is an MPEG transport stream containing MPEG programming. The MPEG transport stream may be multiplexed in accordance with the principles of the present invention, with input signals from switch 230, receiver 213 and control system 232. In typical systems (not shown) the multiplexing logic would multiplex MPEG data streams carrying MPEG programming. In the present invention, the multiplexing logic 222 processes the input signals and multiplexes at least a portion of the input signals into ASI interface 240. The multiplexing logic 222 may multiplex a multiple of data streams carrying both MPEG programming 244 and DOCSIS data 226 as described below. As would be known to one skilled in the art, the ASI interface 240 converts the parallel signal into a serial configuration and adds "stuff packets" as necessary to maintain the data rate.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers 114 (shown in FIG. 1) may download content to an application server 216 located within the DBDS 100. The application server 216 may be located within headend 102 or elsewhere within DBDS 100, such as in a hub 104.

The various inputs into the headend 102 are then combined with the other information from the control system 232, which is specific to the DBDS 100, such as local programming and control information, which can include among other things conditional access information. The headend 102 contains one or more modulators 228 to convert the received transport streams 240 into modulated output signals suitable for transmission over the transmission medium 250 through distribution systems 252. Each modulator 228 may be a multimodulator including a plurality of modulators, such as, but not limited to, QAM modulators, that modulate the radio frequencies with at least a portion of the input the transport streams 240 and transmit therefrom output transport streams 242. The output signals 242 from the various modulators 228 or multimodulators are combined, using equipment such as a combiner 246, for input into the transmission medium 250, which is sent via the in-band delivery path 254 to the subscriber locations 108.

In a preferred embodiment, the server 216 also provides DOCSIS data 218 to the headend 102. The data is received by the media access control functions 224, and in accordance with DOCSIS standards, each of the media access control functions 224 outputs MPEG transport packets containing DOCSIS data 226 instead of MPEG programming 244. As would be known to someone skilled in the art, a well known packet identification (PID) has been reserved for DOCSIS data channels under the DOCSIS standards.

There are various types of interfaces for interconnecting headend equipment carrying MPEG transport data. The most commonly known is the asynchronous serial interface or ASI. ASI provides a high data capacity single wire interconnection. An ASI output interface preferably receives eight bit data words at a rate of up to 27 Mwords per second and codes them into ten bit words. These words are serialized and output at 270 MB/s. If no data is available from the source, the ASI interface 240 stuffs the link with a special ten-bit character which is discarded by the ASI receiver. This allows the interface to support data rates from zero b/s to 216 b/s. Since an ASI interface 240 will support the data rate requirement for multiple DOCSIS forward channels, it is desired to provide a scheme for multiplexing several DOCSIS signals onto a single ASI interface 240. This will allow equipment with multiple media access control functions to interface to modulator functions with a single data connection. Since all of the media access controls 224 cannot have access to the ASI interface 240 simultaneously, there preferably is some sort of buffering, and a need to account for resulting time delays.

Multiplexing different media access control outputs 226 is not possible with typical dedicated QAM modulators, as each media access control 224 in conventional DOCSIS compliant systems is typically attached directly to a modulator 228 dedicated to one DOCSIS data stream. In the preferred embodiment, the media access controls 224 are separated from the modulator 228. In this manner, multiple media access controls 224 may be multiplexed into one DOCSIS data stream. Additionally, MPEG programming such as video or audio from a video camera 214 or other input source 210 may be multiplexed with the DOCSIS data into one stream of transport packets. In the multiplexed data stream some of the transport packets may contain DOCSIS data and other transport packets may contain MPEG programming (video and audio).

This embodiment allows a video QAM modulator 228 or multi-QAM modulator to be used to modulate a DOCSIS data stream. Additionally, this has the advantage of enabling a headend 102 or hub 104 to be used for different purposes at different times. By way of example, a headend 102 or hub 104 could be used to carry primarily DOCSIS data streams during one particular set of hours in the day, while MPEG programming, including video on demand (VOD) may be carried during different hours without the need to use different modulators 228.

The control system 232 enables the television system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain programs or portions of transport streams for inclusion in one or more output transport stream 242, system specific MPEG table packet organization, and/or conditional access information. The multiplexing logic 222, and media access controls 224 are synchronized at initialization to synchronize counters used for time stamps (See FIG. 3 Step 308; FIG. 4 Steps 403, 408, 410). The counters may be synchronized to the MAC microprocessor in one implementation, or in other ways. Control information and other data can be communicated to hubs 104 and DHCTs 110 via an IP network or in-band delivery path 254, respectively or via an out-of-band delivery path 256.

The out-of-band data is transmitted via the out-of-band downstream path 258 of transmission medium 250 by means such as, but not limited to, a Quadrature Phase-Shift Keying (QPSK) modem array 260. Two-way communication utilizes the upstream portion 262 of the out-of-band delivery system. DHCTs 110 transmit out-of-band data through the transmission medium 250, and the out of band data is received in hubs 104 via out-of-band upstream paths 262, and communicated to a headend 102 via IP network The out-of-band data is routed through router 264 to an application server 216 or to control system 232. The out-of-band control information includes such information as a pay-per-view purchase instruction and a pause viewing command from the subscriber location 108 (shown in FIG. 1) to a video-on-demand type application server 216, as well as any other data sent from the DHCT 110 or hubs 104.

The control system 232, such as a Scientific-Atlanta Digital Network Control System (DNCS), for example, without limitation, also monitors, controls, and coordinates all communications in the subscriber television system, including video, audio, and data. The control system 232 can be located at headend 102 or remotely.

The transmission medium 250 distributes signals from the headend 102 to the other elements in the subscriber television system, such as a hub 104, a node 106, and subscriber locations 108 (shown in FIG. 1). The transmission medium 250 can incorporate one or more of a variety of media, such as optical fiber, coaxial cable, and hybrid fiber-coax (HFC), satellite, direct broadcast, or other transmission media.

Multiplexing Logic

The logic of the present invention can be implemented in hardware, software, firmware, or a combination thereof. In the preferred embodiment, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 3:
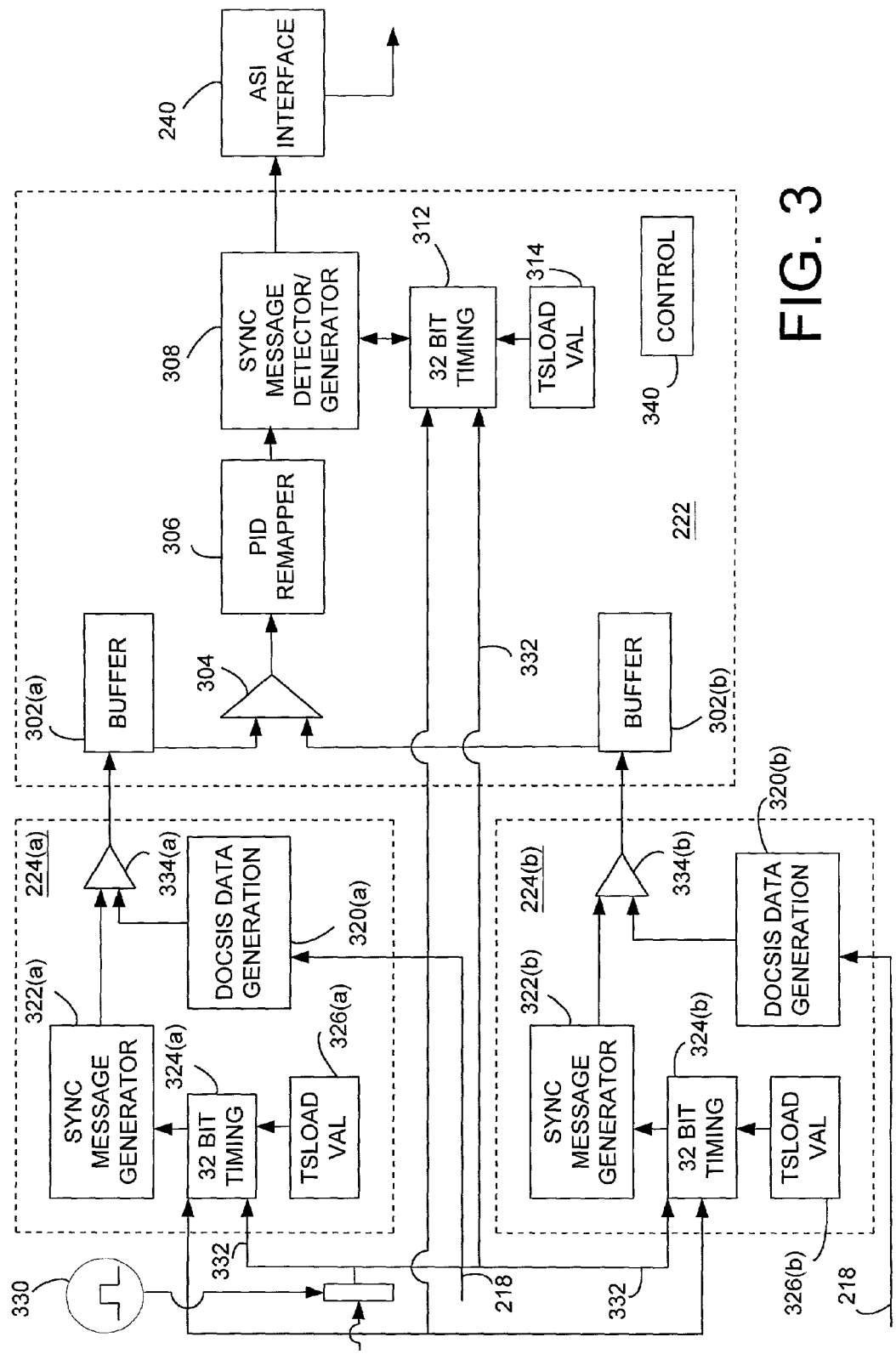
FIG. 3 is a block diagram representation of one embodiment of the present invention depicting the integration of multiple media access controls.
Figure 4:
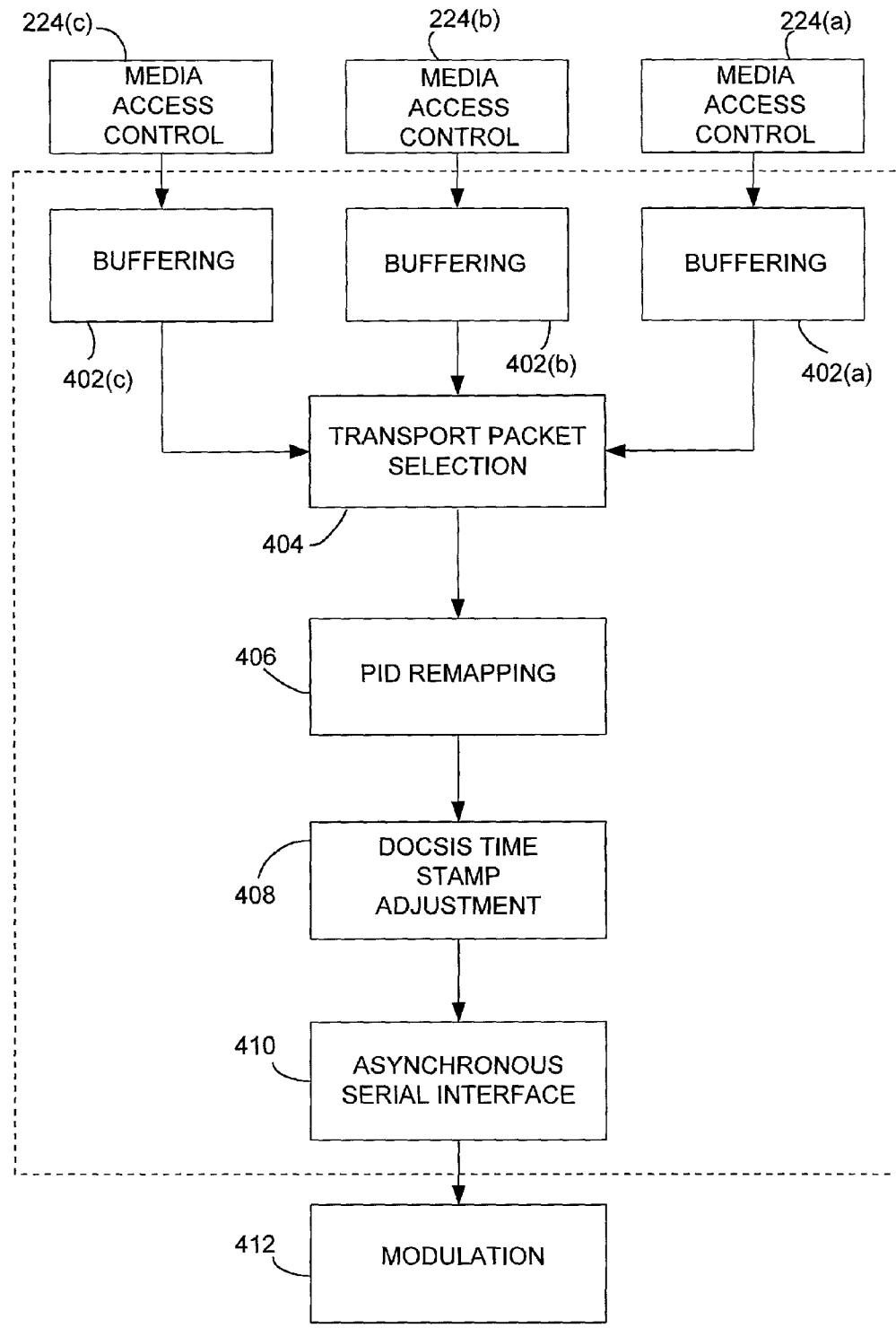
FIG. 4 is a flowchart representation of representative steps of one embodiment of the present invention depicting the interfacing of multiple media access controls.

FIG. 3 is a block diagram representation of one embodiment of the present invention depicting the integration of multiple media access control functions 224(a), 224(b). In this example there are two media access control (MAC) functions 224(a), 224(b) being multiplexed into a single ASI interface 240, however there could easily be more than two MAC functions (not shown). The server 216 (see FIG. 2) provides input 218 to the MAC functions 224(a), 224(b). As would be known to one skilled in the art, the MAC functions 224(a), 224(b) may, for example comprise a DOCSIS data generator 320(a), 320(b), and a SYNC message generator 322(a), 322(b). As described above, under DOCSIS, the outputs from the MAC 224(a), 224(b) are MPEG transport packets which have had DOCSIS data mapped into the packets. In order to synchronize reverse channel transmissions, a time reference is transmitted to each cable modem through the forward QAM data channel. This time reference or SYNC message is generated by a SYNC message generator 322(a), 322(b) in the MAC 224(a), 224(b) and is the value of a 32 bit counter 324(a), 324(b).

The MAC 224(a), 224(b) may also be responsible for generating the correct information rate of the QAM modulator to which it connects. Since the data rates from the different media access controls 224(a), 224(b) are not synchronized and data packet arrival time from the different media access controls 224(a), 224(b) are not synchronized, the output of each media access control 224(a), 224(b) in the preferred embodiment is routed to a data buffer 302(a), 302(b). The buffers 302(a), 302(b) are preferably first-in-first-out ("FIFO") buffers. The contents of the buffers 302(a), 302(b) are selected by a control 340 on an alternating basis as data packets become available in the buffers 302(a), 302(b).

In the implementation depicted in FIG. 3 with two MACs 224(a), 224(b), the control 340 will ping-pong back and forth between the media access controls 224(a), 224(b). In other implementations with more than two MACs 224(a), 224(b), the control 340 will preferably select the contents of the buffers 302(a), 302(b) on a round-robin basis. The control 340 may be implemented by hardware, software, firmware, or a combination thereof. In the preferred embodiment the control 340 is a state machine. After data is read from a buffer 302(a), 302(b), and processed through a multiplexer 304, the PIDs are remapped by a PID remapper 306 from the well known DOCSIS PID and MPEG stuff packet PID to defined PIDS for each MAC 224(a), 224(b). As is known to one skilled in the art, PID remapping comprises replacing the PID in the header of the packet with a different value to prevent conflicting PIDs and/or two or more packets from having the same PID value in the header. The defined identifiers will allow data and stuff packets generated by a specific MAC 224(a), 224(b) to be identified at the receive end of the ASI link.

In order to correct for the variable time delay of the buffer 302(a), 302(b), the DOCSIS SYNC message must be altered. As discussed above, as would be known to one skilled in the art, the SYNC message is generated by a SYNC message generator 322(a), 322(b) in the MAC 224(a), 224(b) and contains a 32 bit value which represents the value of a counter 324(a), 324(b) which is clocked at 10.24 MHz, for example. The value of this counter 324(a), 324(b) is captured at the time the SYNC message is generated by the SYNC message generator 322(a), 322(b).

In the preferred embodiment, the time delay of the buffer 302(a), 302(b) is accounted for by the generation of a new SYNC message by a SYNC message detector/generator 308 in the multiplexing logic 222. This new SYNC message generated comprises a 32 bit value which represents the value of a counter 312 in the multiplexing logic 222 from the same clock that is used to operate the MAC counters 324(a), 324(b). In some MAC designs for example, the MAC has the ability to have a value which is programmed into an internal register 326(a), 326(b) loaded into the counter 324(a), 324(b) on the clock cycle immediately following the load enable pin toggle 332. In the preferred embodiment, the same value is loaded simultaneously into the MAC counters 324(a), 324(b) and the counter 312 in the multiplexing logic 222. In the preferred embodiment this value is loaded once during initialization, and the asynchronous load signal is preferably qualified with the system clock to assure that the counters 324(a), 324(b), 312 will be synchronized to the same state, however other methods for synchronizing the counters 324(a), 324(b), 312 are possible and would be known to one skilled in the art.

In the preferred embodiment, the original SYNC message inside its packet is replaced with the new SYNC message generated by the SYNC message detector/generator 308 in the multiplexing logic 222. In an alternative embodiment, the time the data is buffered may be measured and added to the original SYNC message to calculate the new SYNC message.

As the data is read from the buffer 302(*a*), 302(*b*), the PID remapper 306 remaps the PID and the data is parsed by the SYNC message detector/generator 308 to detect any SYNC messages. If any SYNC messages are found, a new SYNC message is generated 308 and the new SYNC message is inserted in place of the original SYNC message. The data is then provided to the ASI interface 240 for transport to the modulator. In this manner, the present invention enables multiple DOCSIS data streams to be combined into one ASI stream. Combining the DOCSIS data streams in this manner allows, among other advantages, for use of more of the 27 Mwords per second bandwidth available on the ASI interface 240. Another example of an advantage of the preferred embodiment is the ability to connect devices with multiple MACs to devices with multiple QAMs though a single ASI interface 240.

FIG. 4 shows representative steps of interfacing one or more MACs 224(*a*), 224(*b*), 224(*c*) to one or more modulators for modulation (Step 412) in accordance with a preferred embodiment. As depicted in FIG. 4, more than one MAC 224(*a*), 224(*b*), 224(*c*) may be multiplexed. FIG. 4 shows three MACs 224(*a*), 224(*b*), 224(*c*) being multiplexed, however more or fewer MACs 224(*a*), 224(*b*), 224(*c*) may be multiplexed.

In the preferred embodiment shown in FIG. 4, the multiplexing logic (FIG. 2, 222) includes buffering (Step 402) the output of each media access control 224. The MPEG-compliant transport packets containing DOCSIS data are buffered (Step 402) until selected (Step 404). The buffers are preferably selected (Step 404) for example, by a control 340 in the mutliplexing logic 222, on an alternating basis to ensure a steady stream of transport packets for modulation (Step 412). In one implementation of the preferred embodiment, the buffers are selected (Step 404) on a round-robin basis as transport packets of DOCSIS data become available.

The transport packet selected (Step 404) will have the transport packet identification (PID) remapped (Step 406). Each transport packet and stuff packet is assigned a new unique identification (Step 406) corresponding to the MAC 224(*a*), 224(*b*), 224(*c*) from which the transport packet originated. Remapping the PID (Step 406) of each transport packet and stuff packet allows proper identification of the appropriate destination for the individual transport packets at later stages (see Step 412). As would be known to one skilled in the art, PID remapping may be accomplished by a variety of methods, such as, for example and without limitation, by use of a table or by an algorithm.

All transport packets are remapped (Step 406) in the preferred embodiment, including any MPEG stuff packets that may be created by the MAC 224(*a*), 224(*b*), 224(*c*). The stuff packets have the PID remapped (Step 406) along with transport packets containing DOCSIS data in order to, among other things, prevent the ASI interface 410 from discarding the stuff packets. In a preferred embodiment, the MACs 224(*a*), 224 (*b*), 224(*c*) are set at a 64 QAM mode, while the modulation (Step 412) operates in a 256 QAM mode. These differential QAM rates allow multiple MAC 224(*a*), 224 (*b*), 224(*c*)to be multiplexed for modulation (Step 412) to ensure that bandwidth is available in the modulator. In another embodiment, the MAC would have an adjustable and/or programmable output rate, such that the output rate of the MAC could be controlled and adjusted as required to ensure that bandwidth is available in the modulator.

After the PID remapping (Step 406), time delay from buffering (Step 402) the transport packet is corrected with a time stamp adjustment (Step 408). As the transport packet finishes the PID remapping (Step 406), it is viewed (parsed) to see if a DOCSIS time stamp is detected (Step 408). DOCSIS data packets contain a 32-bit value representing the value of a counter clocked at 10.24 MHz, for example. As discussed above, the value of this counter is captured at the time the DOCSIS SYNC message is generated by each MAC 224(*a*), 224 (*b*), 224(*c*). In the preferred embodiment, a new time stamp is generated and replaces the old time stamp (Step 408). As discussed above, to ensure accuracy in the time stamp adjustment (Step 408), it is preferable that a counter FIG. 3, 312 in the multiplexing logic 222 be synchronized with the counters FIG. 3, 324(*a*), 324(*b*) in each MAC 224(*a*), 224 (*b*), 224(*c*) during system initialization and clocked with the same clock signal.

In an alternative embodiment, the amount of time that the data packet spent in the buffer (Step 4302) may be measured, and then added to the value of the time stamp generated by the MAC 224(*a*), 224 (*b*), 224(*c*), thereby adjusting the DOCSIS time stamp (Step 408).

Additionally, a time stamp adjustment is needed to account for where in the transport packet containing DOCSIS data the SYNC message is found. This may be accomplished in a variety of ways. In one embodiment, a "snapshot" of the time stamp value is taken at the beginning of the time stamp adjustment, and the time stamp is located. The number of bytes from the beginning of the packet to the location of the time stamp within the packet is counted and the number of bytes is converted to a time value on a 27 MHz clock scale. The time value on the 27 MHz clock scale is then converted to a time value on the 10.24 MHz DOCSIS clock scale, and this time value is added to the SYNC message time value.

After the time stamp is adjusted (Step 408), the transport packet is then provided to the ASI interface 410 and transported for modulation (Step 412). In the preferred embodiment, modulation (Step 412) is performed by a QAM modulator operating in a 256 QAM mode. In one embodiment, the QAM modulator is preferably configured to filter on the correct set of PIDs for the DOCSIS stream that it will carry. The QAM modulator preferably remaps the PIDs for these packets to the well-known DOCSIS PID and the stuff packet PID if applicable.

As is known to one with skill in the art, the QAM modulator can operate in one of two manners. In one embodiment, the modulator will lock its symbol rate to the incoming data rate and time correct any DOCSIS SYNC messages if constant latency cannot be guaranteed in the QAM modulator, such as if input stuffing packets are dumped. Thus, in that embodiment, retention of stuffing packets through the modulator avoids the need to implement an additional DOCSIS time stamp adjustment, as described above, in the modulator. In another embodiment, the modulator may generate the symbol rate asynchronously, and generate MPEG stuff packets to fill in any excess QAM channel bandwidth. In this embodiment, the QAM modulator must also time correct any DOCSIS SYNC messages, as described above, if constant latency cannot be guaranteed.

In another preferred embodiment, the ASI interface (410) forwards the transport packets to a multiple QAM modulator or multimodulator. The operation of a multimodulator is described in U.S. patent application Ser. No. 09/845510, which is incorporated herein by reference. The multiple QAM modulator will be configured to pass the proper set of data packets for a DOCSIS stream to the proper QAM modulator. Once the decision has been made as to which modulator to route the transport packet to, the PIDs are remapped to the well-known DOCSIS PID, and the PIDs of any stuff packets must be remapped to the well-known stuff packet PID. In this preferred embodiment, the multiple QAM modulator may receive inputs from more than one ASI interface 410, thus combinations of streams from different ASI interfaces 410 may be modulated together (not shown).

Note that FIG. 4 depicts the multiple MACs 224(*a*), 224 (*b*), 224(*c*) in a parallel configuration. In an alternative implementation (not shown) the multiple MACs 224(*a*), 224(*b*), 224(*c*) may be in a serial configuration. In this implementation, time stamp detection, correction, and/or generation would preferably be performed at each successive MAC to ensure accurate time stamps for the transport packets. In one such implementation, a phase lock loop may be used to emulate the system clock and the time value generated by the phase lock loop may be used to ensure that SYNC messages are synchronized to the same clock.

In a further alternative implementation (not shown) the multiple MAC 224(*a*), 224(*b*), 224(*c*) may be configured in parallel sets wherein each of the parallel sets comprises two or more MAC 224(*a*), 224 (*b*), 224(*c*) configured in a serial configuration. Other implementations consisting of other combinations and configurations of the MAC 224(*a*), 224(*b*), 224(*c*) would be apparent to one skilled in the art, and each such implementation is intended to be included herein within the scope of this disclosure and the present invention.

Figure 5:
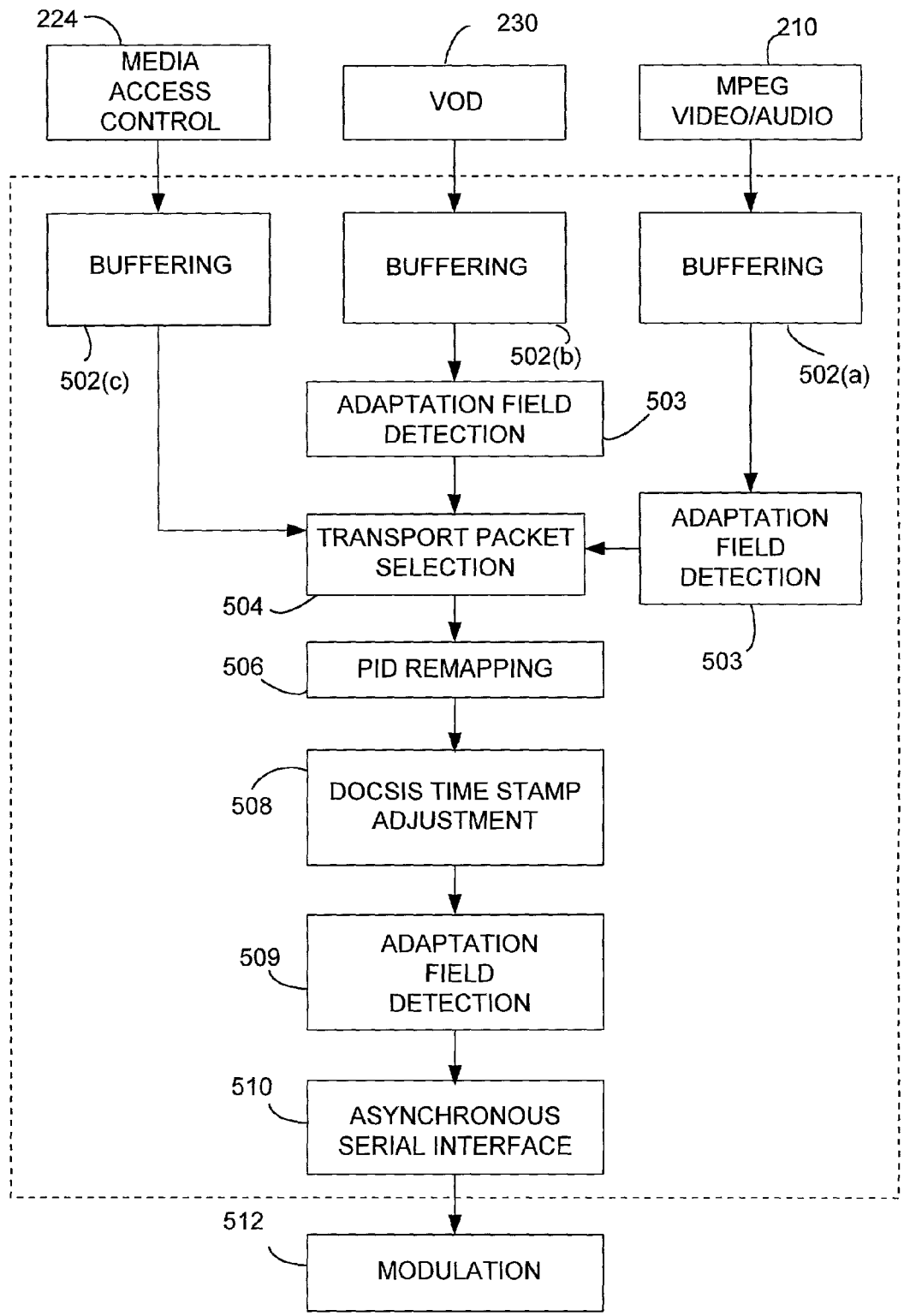
FIG. 5 is a flowchart representation of representative steps of another embodiment of the present invention depicting the integration of multiple types of data streams.

Turning now to FIG. 5, representational steps of an alternative implementation of the preferred embodiment of the present invention is depicted. In this implementation, output from a media access control 224 is multiplexed with other inputs, for example MPEG audio and video ("A/V") 210 and VOD 230. In this implementation, the A/V 210, VOD 230, and MAC 224 outputs are each individually buffered (Steps 502(*a*), 502(*b*), and 502(*c*) respectively). In the preferred embodiment, the buffering (Steps 502(*a*), 502(*b*), and 502(*c*)) is performed by first-in-first-out ("FIFO") buffers. As transport packets become available in the buffers, the transport packets are selected (Step 504) in a manner similar to that described above (FIG. 4, Step 404).

In the preferred implementation, the VOD 230 and A/V 210transport packets are subjected to detection of an adaptation field (Step 503). The adaptation field detection (Step 503) checks each transport packet carrying A/V 210 or VOD 230 programming for an MPEG time stamp. If an MPEG time stamp is detected, the MPEG time stamp is replaced with a current MPEG time stamp (Step 503) obtained from the local clock (in synchronization with the counters as described above).

The selected transport packet then has the PID remapped (Step 506), including remapping of the PID of any stuff packets. The PID remapping (Step 506) is to a defined value corresponding to the source of the transport packet to allow for later identification of the proper destination for the transport packet (See Step 512). After the PID is remapped (Step 506), the transport packet is checked (parsed) for a DOCSIS time stamp (Step 508). In the preferred embodiment, if a DOCSIS time stamp is found, the DOCSIS time stamp is replaced with a current time stamp in the preferred embodiment (Step 508). In this embodiment, a new time stamp is generated by a counter in synchronization with the counters in the MAC 224, as described above in relation to FIGS. 3 and 4. In an alternative embodiment, the time that the transport packet spent being buffered (Step 502) may be measured and added to the original time stamp generated by the MAC 224 to provide a current time stamp (Step 508).

After the DOCSIS time stamp is adjusted (Step 508), the transport packet is then subjected to adaptation field detection (Step 509) to ensure the correct timing of VOD 230 and/or A/V 210 transport packets. Note that DOCSIS data will not have an adaptation field, so no MPEG time stamp will be detected in the transport packets containing DOCSIS data, and the DOCSIS data will be transferred via the ASI interface 510 for modulation (Step 512) without need for further adjustment to the DOCSIS time stamp. If an adaptation field is detected (Step 509), the time stamp of the VOD 230 or A/V 210 transport packet is updated with a current time value (Step 509). The ASI interface 510 then transfers the transport packets for modulation (Step 512).

In one implementation, the modulation (Step 512) will be a single QAM modulator. In this implementation the modulator must be configured to filter on the correct set of PIDs for the DOCSIS steam that it will carry. The QAM modulator will remap the PIDs for these packets back to the well-known DOCSIS PID, and to the stuff packet PID if necessary.

The modulation (Step 512) can operate in one of two manners as described above in relation to FIG. 4.

As with FIG. 4, note that FIG. 5 depicts the MAC 224, VOD 230, and A/V 210 information streams in a parallel configuration. In an alternative implementation (not shown) the multiple information streams may be in a serial configuration as described above. In addition as described above in relation to FIG. 4, further alternative implementations (not shown) for the multiple information streams may be configured in parallel sets wherein each of the parallel sets comprises two or more information streams configured in a serial configuration. Other implementations consisting of other combinations and configurations of the information streams would be apparent to one skilled in the art, and each such implementation is intended to be included herein with the scope of this disclosure and the present invention.

It should be emphasized that the above-described embodiments of the present invention, particularly, any "preferred" embodiments, are merely possible examples of implementations set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for interfacing with a modulator in a broadband communication system, the method comprising the steps of:
   receiving a plurality of packet streams, the packet streams containing a plurality of packets, including packets containing reverse channel synchronization messages;
   buffering each packet from the plurality of packet streams;
   detecting a packet identifier within each packet;
   remapping the packet identifier within each packet; and
   combining the plurality of packet streams into a single stream.

2. The method of claim 1, wherein the step of remapping the packet identifier comprises the steps of:
   determining a new packet identifier; and
   replacing the packet identifier with the new packet identifier.

3. The method of claim 2, wherein the packet identifier comprises a PID.

4. The method of claim 3, wherein the step of remapping the packet identifier within each packet further comprises remapping the packet identifier of stuff packets.

5. The method of claim 4, wherein the method further comprises the step of providing the single data stream to a modulator.

6. The method of claim 5, further comprising the step of providing an adjustment reverse channel synchronization message for maintaining reverse channel synchronization of each packet received from a plurality of cable modems.

7. The method of claim 6, wherein the step of providing the single data stream to a modulator further comprises remapping the new packet identifier back to the original packet identifier.

8. A method for interfacing with a modulator in a broadband communication system, the method comprising the steps of:
    receiving a plurality of packet streams, the packet streams containing a plurality of transport packets, including shared reverse channel timing control information;
    buffering each of the plurality of packet streams; and
    integrating the buffered plurality of packet streams into one stream,
    wherein the shared reverse channel timing control information in the plurality of packets is generated in order to synchronize reverse channel transmissions received from a plurality of cable modems.

9. The method of claim 8, further comprising the step of providing the one stream to a modulator.

10. The method of claim 9, wherein the step of providing the one stream to the modulator comprises carrying the one stream via an asynchronous serial interface.

11. The method of claim 9, wherein the modulator comprises a QAM modulator.

12. The method of claim 9, wherein the modulator further comprises a multi-QAM modulator.

13. The method of claim 8, wherein the plurality of packet streams containing a plurality of transport packets further comprises packet streams conforming to the DOCSIS standard, wherein the plurality of transport packets conforms to the MPEG protocol, each of the plurality of transport packets having a packet identification.

14. The method of claim 8, wherein the buffering is performed by a first in first out buffer.

15. The method of claim 14, wherein the step of buffering each of the plurality of packet streams further comprises the steps of:
    identifying a packet identifier within the transport packet;
    determining a new packet identifier; and
    replacing the packet identifier of the transport packet with the new packet identifier.

16. The method of claim 15, wherein the step of receiving a plurality of packet streams further comprises receiving at least two separate packet streams wherein the plurality of transport packets include a reverse channel synchronization message.

17. The method of claim 16, wherein the step of adjusting shared reverse channel timing control information comprises the steps of:
    parsing the transport packet;
    detecting a time reference value in the transport packet;
    determining a location in the transport packet of the time reference value;
    generating a new time reference value from a clock synchronized with a system clock; and
    replacing the detected time reference value in the transport packet with the new time reference value.

18. The method of claim 17, wherein the step of generating a new time reference value from a clock synchronized with a system clock further comprises the step of adjusting the new time reference value based on the location in the location in the transport packet of the time reference value.

19. The method of claim 18, wherein the plurality of packet streams containing a plurality of transport packets further comprises MPEG packet streams conforming to the MPEG protocol, each MPEG packet stream containing a plurality of MPEG transport packets, the plurality of MPEG transport packets containing MPEG programming.

20. The method of claim 19, further including the step of adjusting an MPEG transport packet timing, including the step of detecting an adaptation field in an MPEG transport packet.

21. The method of claim 20, wherein the step of adjusting an MPEG transport packet timing, further comprising the steps of:
    detecting the value of timing message within a transportation packet;
    generating a replacement timing message; and
    replacing the timing message in the transportation packet with the replacement timing message.

22. The method of claim 21, wherein the plurality of packet streams are configured in parallel with each other.

23. The method of claim 22, wherein the plurality of packet streams are configured in a series.

24. The method of claim 23, wherein the plurality of packet streams are configured as multiple sets of packet streams, each set of packet streams comprising one or more packet stream configured in a series, each set of packet streams being configured in parallel with the other sets of packet streams.

25. The method of claim 24, wherein the modulator operates at constant latency.

26. The method of claim 25, wherein the modulator operates at variable latency.

27. The method of claim 26, wherein the method further comprises the step of making a second adjustment in the plurality of packets to the timing control of the shared reverse channel.

28. An apparatus for interfacing a plurality of information streams, the information streams comprising data streams conforming to the DOCSIS standard, each data stream comprising a plurality of transport packets, the plurality of transport packets conforming to the MPEG protocol, each of the plurality of transport packets having a packet identification, the apparatus comprising:
    a plurality of buffers, each buffer containing one of the plurality of information streams; a selector, configured to select a transport packet from the plurality of buffers;
    a remapper, configured to remap a packet identification of the transport packet of the selected stream with a unique packet identification, the unique packet identification corresponding a source of the information stream; and
    a time reference adjuster, configured to adjust the time reference of the transport packet of the selected data stream; and an asynchronous serial interface.

29. The apparatus of claim 28, wherein the plurality of information streams further comprise one or more MPEG streams, each MPEG stream conforming to the MPEG protocol, each MPEG stream containing a plurality of transport packets, the transport packets containing MPEG programming.

30. The apparatus of claim 29, wherein the selector comprises a state machine.

31. The apparatus of claim 30, wherein the apparatus further comprises a QAM modulator, the QAM modulator configured to receive an input from the asynchronous serial interface.

32. The apparatus of claim 31, wherein the QAM modulator comprises a multi-QAM modulator.

33. The apparatus of claim 32, wherein the asynchronous serial interface comprises multiple parallel asynchronous serial interfaces.

34. The apparatus of claim 33, wherein the plurality of information streams are configured in parallel with each other.

35. The apparatus of claim 34, wherein the plurality of information streams are configured in a series.

36. The apparatus of claim 35, wherein the plurality of information streams are configured as multiple sets of information streams, each set of information streams comprising one or more information stream configured in a series, each set of information streams being configured in parallel with the other sets of information streams.

37. An apparatus for interfacing with a modulator in a broadband communication system, the apparatus comprising:
   a plurality of buffers configured to receive individual packets from a plurality of packet streams including packets containing reverse channel synchronization messages;
   a detector configured to detect a packet identifier within each packet;
   a remapper configured to remap the packet identifier within each packet; and
   an asynchronous serial interface.

38. An apparatus for interfacing with a modulator in a broadband communication system, the apparatus comprising:
   a multiplexer configured to integrate a plurality of packet streams into one stream containing a plurality of transport packets, including packets sharing a reverse channel;
   a timing control configured to provide an adjusted timing control for maintaining reverse channel synchronization of each reverse channel packet;
   a remapper configured to remap a packet identifier within each packet; and
   an asynchronous serial interface connected to the timing control.

* * * * *